United States Patent [19]

Shimada et al.

[11] Patent Number: 4,937,808
[45] Date of Patent: Jun. 26, 1990

[54] INTERGRATED OPTICAL HEAD WITH FLEXIBLE SUBSTRATE PORTION

[75] Inventors: Satoshi Shimada; Shinji Ohyama; Manabu Sato, all of Hitachi; Masahiko Ibamoto, Katsuta; Yoshio Sato, Hitachi; Nobuyoshi Tsuboi, Naka; Norifumi Miyamoto, Hitachi; Hiroyuki Minemura, Hitachi; Hiroaki Koyanagi, Hitachi, all of Japan

[73] Assignee: Hitachi, Ltd., Tokyo, Japan

[21] Appl. No.: 151,567

[22] Filed: Feb. 2, 1988

[30] Foreign Application Priority Data

Feb. 25, 1987 [JP] Japan .................................. 62-40297

[51] Int. Cl.$^5$ .......................... G02B 6/12; G11B 7/135
[52] U.S. Cl. .................................. 369/112; 369/44.11; 350/96.12; 350/96.18
[58] Field of Search ................ 369/111, 112, 109, 122, 369/120, 44; 350/255, 252, 96.11, 96.12, 96.13, 96.18, 96.19

[56] References Cited

U.S. PATENT DOCUMENTS

| 4,718,052 | 1/1988 | Kondo et al. | 369/44 |
| 4,737,946 | 4/1988 | Yamoshita | 369/122 |
| 4,778,991 | 10/1988 | Nozaki et al. | 350/358 |

FOREIGN PATENT DOCUMENTS

| 0217382 | 4/1987 | European Pat. Off. |
| 3534776 | 4/1986 | Fed. Rep. of Germany |
| 2389143 | 1/1978 | France |
| 60-129938 | 7/1985 | Japan |
| 61-61246 | 3/1986 | Japan |

OTHER PUBLICATIONS

Translation of Japanese Patent Laid-Open Publication No. 60-129938 (Summary).

Primary Examiner—Vincent P. Canney
Assistant Examiner—James E. Tomassini
Attorney, Agent, or Firm—Kenyon & Kenyon

[57] ABSTRACT

An optical head including a substrate, an optical waveguide formed on the substrate, a light source formed on a portion of the substrate, a collimator lens for converting light from the light source into parallel light rays, an objective lens for focusing light from the collimator lens onto a recording medium and for converting reflected light from the recording medium into parallel light rays, a beam splitter for dividing light from the objective lens into two parts to send out one of the parts in a predetermined direction, a coupling lens for focusing light from the beam splitter on a position, and a photodetector for detecting light from the coupling lens, is disclosed, in which the collimator lens, the objective lens, the beam splitter, the coupling lens and the photodetector are integrated on the substrate, and the collimator lens or an objective lens supporting part is made flexible to vary the position of the focus of the collimator lens or objective lens by piezo-electric elements.

6 Claims, 12 Drawing Sheets

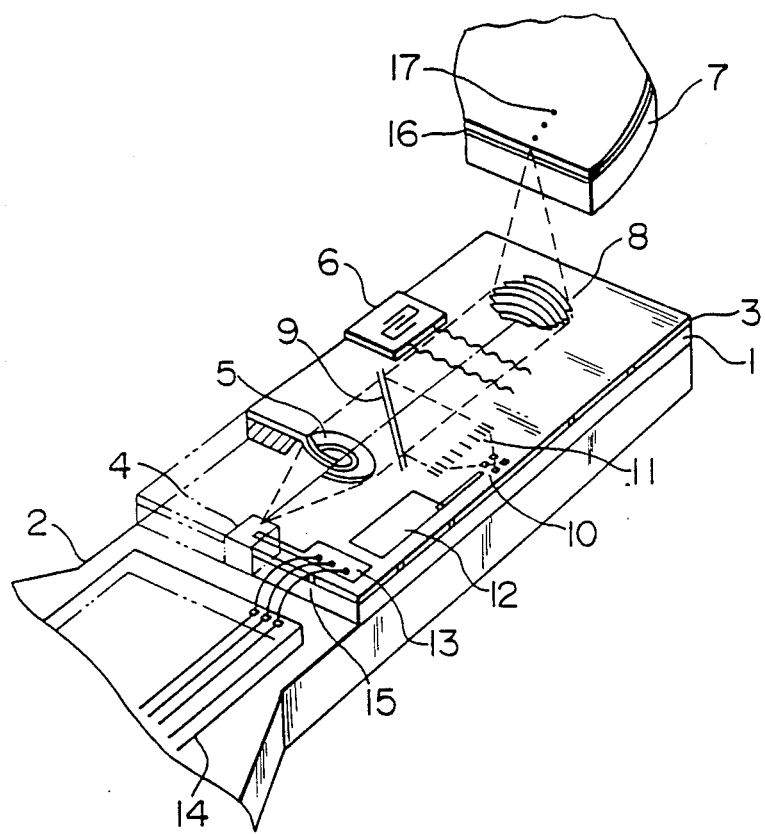
FIG. IA

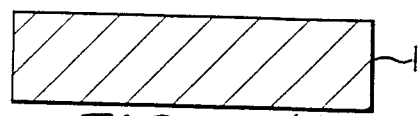
FIG.2A(1)
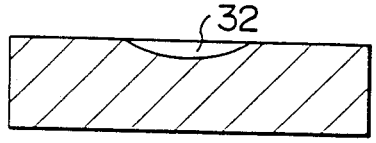
FIG.2A(2)
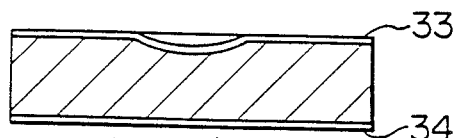
FIG.2A(3)
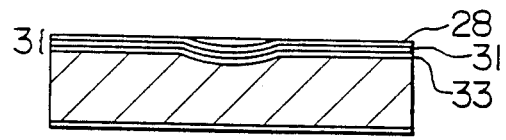
FIG.2A(4)
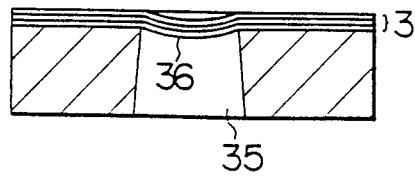
FIG.2A(5)

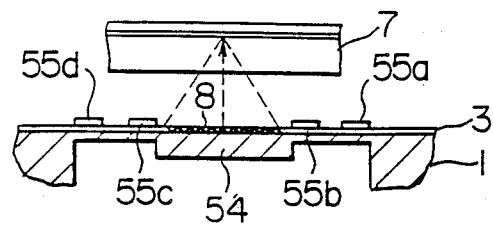
FIG. 5C(1)
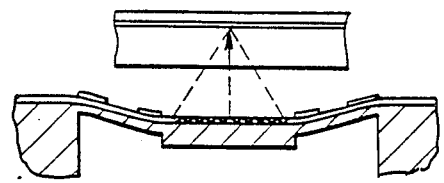
FIG. 5C(2)
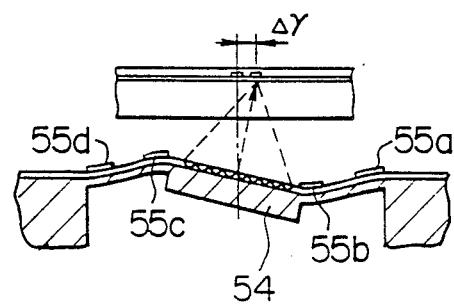
FIG. 5C(3)

FIG. 5D(1)
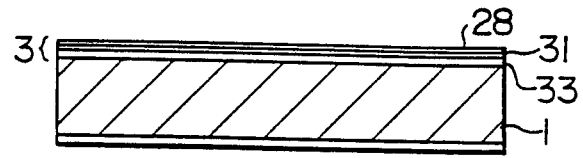
FIG. 5D(2)
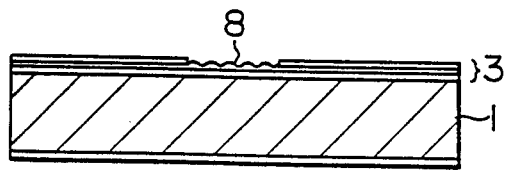
FIG. 5D(3)
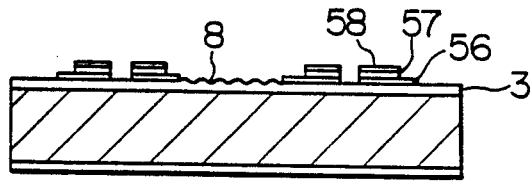
FIG. 5D(4)
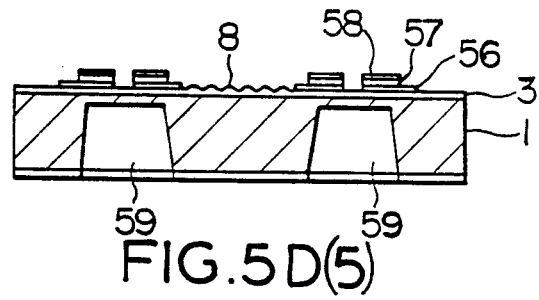
FIG. 5D(5)

INTERGRATED OPTICAL HEAD WITH FLEXIBLE SUBSTRATE PORTION

BACKGROUND OF THE INVENTION

The present invention relates to an optical head, and more particularly to an integrated optical head which is small in size and can access information at high speed.

An integrated optical head is proposed in a Japanese patent application No. JP-A-60-129,938. In this optical head, reflected light from an optical disk is received by a curved grating which is formed in an optical waveguide, and then led to a photodetector to detect a focal error signal and a tracking signal by the photodetector. The above-identified patent application, however, does not disclose an actuator for locating a light spot at an optimum position on the basis of the focal error signal and tracking signal.

Another optical head is disclosed in a Japanese patent application No. JP-A-61-61,246. In this optical head, a light beam from a laser device is shaped by a grating which is formed on an optical guide, and then led to a curved grating, light emerging from the curved grating is focused on an optical disk, and reflected light from the optical disk is detected by a photosensor. In this optical head, however, a conventional force motor coil is used as an actuator for performing a focus control operation and a tracking control operation on the basis of an output signal from the photosensor. Accordingly, it is impossible to access information at high speed, and moreover the shape and size of the optical head are affected greatly by those of the above actuator.

An optical disk is tens of times greater in recording density than a magnetic disk, and has a long life because there is no contact with the optical recording medium. However, a conventional optical head is large in size and slow in response speed. Further, in order to increase the recording capacity of an optical disk apparatus, it is necessary for an optical head to access multiple disks. Accordingly, it is desirable that the optical head is small in thickness.

In the optical head disclosed in the latter patent application, no regard is paid to quick access to information and the access of the optical head to a multiplicity of optical disks. That is, the optical head responds slowly to a focus control device, and moreover is large in size. Thus, it is required to make the distance between adjacent optical disks large, thereby increasing the size of an optical file apparatus. Further, since the above optical head is an integrated optical head, optical elements included in the optical head are low in working efficiency. Accordingly, the intensity of light incident on a photosensor is weak, and thus it is difficult to produce a reliable focus control.

SUMMARY OF THE INVENTION

A first object of the present invention is to provide an optical head which is high in focus control speed and short in time necessary to access information.

A second object of the present invention is to provide an optical head which is small in thickness and weight, and thus can access a multiple optical disk.

A third object of the present invention is to provide an optical head which is high in focus control speed, short in information access time, and small in thickness and weight, and which can record and read information accurately.

In order to attain the first and second objects, according to the present invention, there is provided an optical head, in which a focus control device and a tracking control device are formed on a substrate, and a microlens provided with a piezo-electric actuator and having a large natural frequency is used as a high-speed focus control device. In more detail, the above devices and a light beam control device are formed on a crystal plate made of silicon or quartz, through fine working techniques. That is, materials of these devices are chosen so as to match each other in optical, electrical and mechanical properties. The above materials are also chosen from the standpoint of fabrication process, so as to match each other in chemical property.

In order to attain the third object, according to the present invention, the coupling efficiency among the light beam control device, focus control device and tracking control devices is improved, a curved grating having a blaze angle is used as an objective lens to improve the light emitting efficiency of the objective lens, and a grating is disposed in front of a photodetector to increase the quantity of light incident on the photodetector.

It has been proposed to form an optical head by integrating various elements on a single substrate, but such an integrated optical head has not been realized, for the reason that is has been impossible to form a focus control device as part of the integrated optical head. According to the present invention, a focus control device is formed on a substrate together with other devices, to make possible the fabrication of an integrated optical head. An example of a focus control device according to the present invention is a lens element having an actuator. That is, a thin lens element is formed in a portion of the substrate so as to be flexible, and a piezoelectric film is formed on part of the lens element. Thus, it is possible to move the lens element vertically in accordance with the vertical movement of a rotating optical disk so that a laser beam is always focused on a recording medium. Accordingly, high-quality information can be stably recorded in the recording medium. Such an operation of an optical head is indispensable for high-energy-density optical recording which is carried out in such a manner that a laser beam is focused on an information bit having a diameter of 1 $\mu$m. In more detail, when a focal error is generated by the vertical movement of the rotating optical disk, the energy density of light at an information bit is reduced. Thus, the laser beam produces no effect on the recording medium, and no information is recorded therein. Further, in a case where recorded information is read out to perform a reproducing operation, if a focal error caused by the vertical movement of the optical disk makes it impossible to accurately detect a change in reflected light quantity due to an information bit, a reading error will be generated. In the above, a control operation corresponding to the vertical movement of a rotating optical disk has been explained. Further, a similar control operation is required for a tracking error due to the eccentric rotation of optical disk. In an optical head according to the present invention, a lens having an actuator is inclined so that a laser beam, having passed through the lens, traces a track on a recording medium and is focused on an information bit. Thus, the laser beam is always focused on information bits, and hence information can be accurately recorded and reproduced.

BRIEF DESCRIPTION OF THE DRAWINGS

FIGS. 1A to 1D are schematic diagrams for explaining an integrated optical head according to an embodiment of the present invention.

DETAILED DESCRIPTION

Figure 4A:
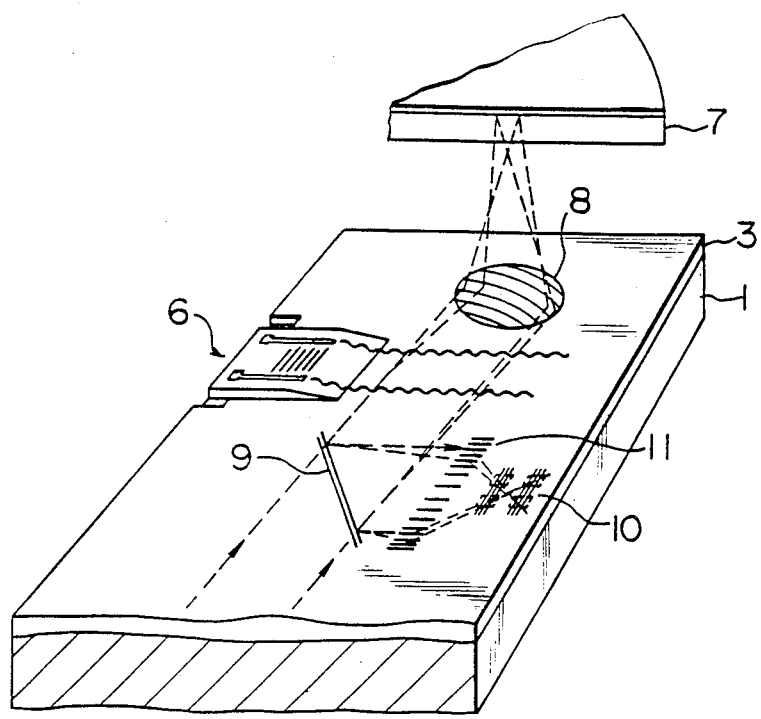
FIGS. 4A to 4E are schematic diagrams for explaining the detection of focal and tracking errors based upon the outputs of photosensors.
Figure 4B:
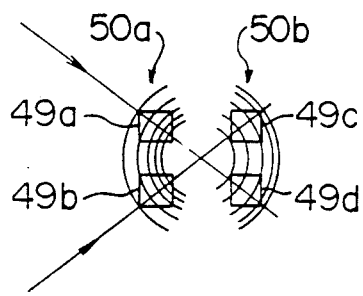
Figure 4C:
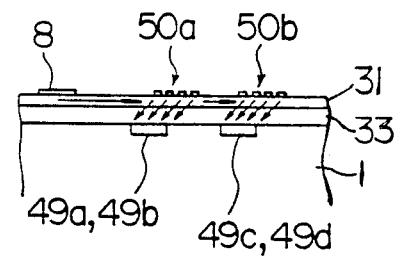

FIG. 1A shows the whole construction of an integrated optical head according to an embodiment of the present invention. Referring to FIG. 1A, a substrate 1 formed of a monocrystalline silicon plate is fixed to a head supporting board 2. In an optical waveguide 3, there are formed a collimator lens 5 having an actuator for shaping a light beam from a semiconductor laser 4, a beam deflector 6 having a surface acoustic wave element for deflecting the light beam, an objective lens 8 for sending out the light beam into the air so as to focus the light beam on a recording medium 16 which is provided on an optical disk 7 and for leading the reflected light beam from the recording medium into the optical waveguide 3, a beam splitter 9 for reflecting a portion of the reflected light beam, and a coupling lens 11 for directing the light beam reflected from the beam splitter 9, toward a photodetector 10. In a case where the substrate 1 is made of monocrystalline silicon, the photodetector 10 is a photosensor group which is formed by diffusing an n-type impurity (for example, boron) and a p-type impurity (for example, phosphorus) into the substrate 1 as shown in FIG. 4C so that a p-n or p-i-n junction is formed at four positions. Incidentally, the character i in the p-i-n junction expresses an intrinsic silicon layer deficient in impurity. Further, a signal amplifier 12 for the output of the photodetector 10 and a drive circuit 13 for the semiconductor laser 4 are formed in the monocrystalline silicon substrate 1. An output signal from the amplifier 12 is applied to and a current to the drive circuit 13 is supplied from a thin-film printed circuit board 14 which is attached to the head supporting board 2, through bonding wires 15.

Figure 1B:
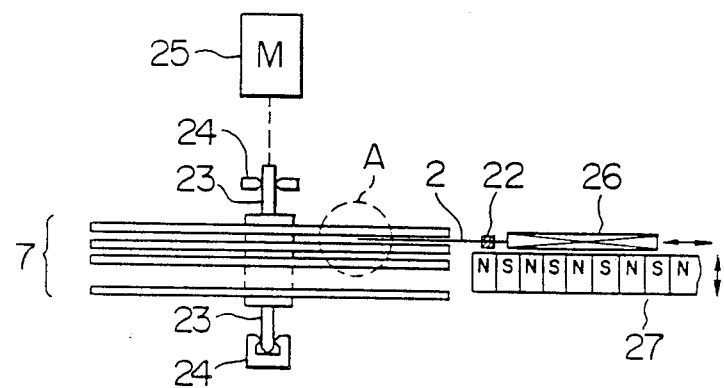
Figure 1C:
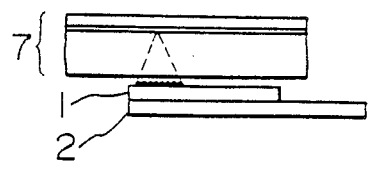
Figure 1D:
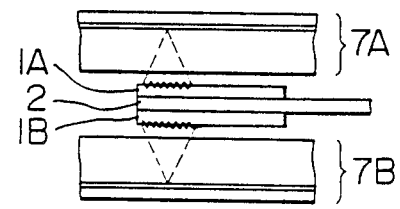

First, an explanation of the operation of the present embodiment is set forth below. A light beam emitted from the semiconductor laser 4 enters into the optical waveguide 3 in the form of a divergent beam. The divergent light beam traveling in the optical waveguide 3 is shaped by the collimator lens 5 having an actuator so that the divergent beam is converted into a light beam composed of parallel light rays, which are incident on the objective lens 8 having an actuator. The objective lens 8 is fabricated in such a manner that a curved grating having a blaze angle is formed in the optical waveguide 3, and has a function of sending out the light beam into the air so as to focus the light beam on the recording medium. The objective lens will be explained later in detail. The light beam emerging from the objective lens is focused on the recording medium 16 which is formed on the optical disk 7. The energy of the focused light beam causes a change in physical property of the recording medium 16 such as refractive index, and thus the reflectivity of the recording medium is changed at a focused-beam receiving position. Light reflected back from the recording medium 16 is led into the optical waveguide 3 through the objective lens 8, and then divided by the beam splitter 9 into two parts, one of which is incident on the photodetector 10 through the coupling lens 11. Thus, the above change in reflectivity can be converted by the photodetector 10 into an electric signal, which is applied to the printed circuit board 14 through the signal amplifier 12. The optical disk 7 runs at 600 to 1,800 rpm. The rotation of the optical disk 7 brings about not only the vertical movement thereof, but also the horizontal deviation of a track where an information bit 17 is to be recorded, from a predetermined position. Hence, it is required to control the light beam so that information is recorded in the recording medium at a desired position. Let us first consider a case where the optical disk 7 is moved in a vertical direction. Referring to FIG. 2D, a focal error signal FA from the photodetector 10 is applied to an autofocusing servo circuit 18, the output of which moves the lens 5 having an actuator in a vertical direction so that the light beam emerging from the objective lens 8 is again focused on the recording medium 16. In a case where the focal error signal FA has a high signal level, the position of the head supporting board 2 in a vertical direction is coarsely adjusted by a piezo-electric actuator 22. Next, let us consider a case where a track on the recording medium 16 is deviated from a predetermined position in a horizontal direction. Referring to FIG. 2D, tracking error signals TA1 and TA2 from the photodetector 10 are applied to an autotracking servo circuit 19, the output of which inclines the lens 5 having an actuator to move the light beam incident on the recording medium 16, in a radial direction of the optical disk 7, thereby correcting the tracking error. The focal error and the tracking error are detected by four photosensors which make up the photodetector 10, in a manner mentioned later. In a case where the optical head is moved from a track on the recording medium to another track, the output of a demodulating circuit 20, as shown in FIG. 2D, is applied to a rotation control circuit 21, the output of which drives a motor 25 by a desired amount. Referring back to FIG. 1A, the deflector 6 deflects the light beam incident on the objective lens 8, only a little by using a high frequency signal. In more detail, a surface acoustic wave is propagated in the optical waveguide 3 by the high frequency signal, to produce a grating in the optical waveguide 3 on the basis of refractive-index distribution, thereby deflecting the light beam by the Bragg's angle. Generally speaking, grooves are cut in the optical disk 7 so that a multiplicity of circular tracks are formed. When a high frequency signal of about 100 kHz is applied to the deflector 6, the light beam is deflected by an angle corresponding to the width of the groove. The reflected light from the optical disk 7 is always monitored by four photosensors of the photodetector 10. Output signals from the photosensors are amplified and then may be fed back to the piezo-electric actuator of the lens 5, to vary the inclination of the lens 5 so that the light beam does not deviate from the groove but is located on the center line of a track. Accordingly, the light beam can be focused on a desired position without moving the substrate 1, that is, a high-speed autofocusing/autotracking operation is performed. The present embodiment has a thickness less than 1 mm. Hence, when attached to a tip portion of the head supporting board 2, the present embodiment, as shown in FIG. 1B, can be inserted into a gap between adjacent disks of the optical disk 7 having a multi-disk structure, to process a large amount of information. Referring to FIGS. 1C and 1D which show an area A of FIG. 1B in more detail, the present embodiment (namely, the integrated optical head) may be attached to each of the top and bottom surfaces of the supporting board 2, as indicated by reference symbols 1A and 1B in FIG. 1D, if necessary. The optical heads 1A and 1B access optical disks 7A and 7B simultaneously or time-divisionally, to process information more efficiently. In FIG. 1B, reference numeral 23 designates the rotating shaft of the optical disk 7, 24 bearings, 25 a motor, 22 a piezoelectric element attached to both surfaces of an end portion of the supporting board 2, for coarsely adjusting the position of the supporting board 2 so that the supporting board 2 is located substantially on the center plane of the gap between the adjacent disks 7A and 7B, 26 a force motor coil, and 27 a magnet for driving the force motor coil 26.

Next, the structure and operation of each of optical elements making up this embodiment of the present invention will be explained below in detail.

Figure 2B:
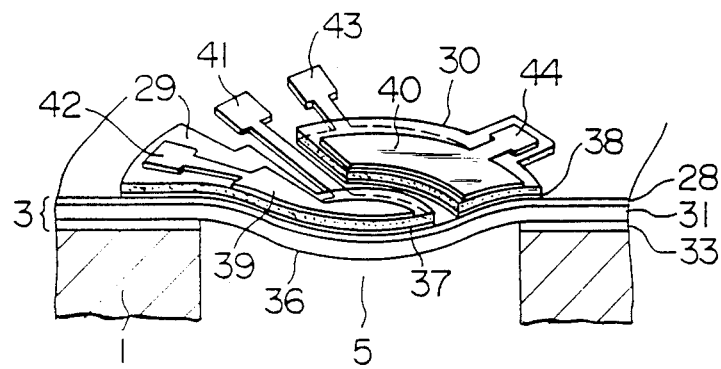
FIGS. 2A(1) to 2A(5), 2B, and 2C are cross-sectional and schematic diagrams for explaining an example of a collimator lens with an actuator according to an embodiment of the present invention.
FIG. 2D is a block diagram which shows servo systems for a focal error signal and a tracking error signal.

The collimator lens 5, as shown in FIG. 2B, is formed in a portion of the optical waveguide 3. Referring to FIG. 2B, a buffer layer 28 is formed on an optical waveguide layer 31 to prevent light which passes through the waveguide layer 31, from being attenuated, and piezoelectric films 29 and 30 are deposited on the buffer layer 28 to serve as actuators. Then, a portion of the substrate 1 is removed to make the line 5 flexible. Thus, the lens 5 having the actuators is obtained. In order for light to pass through the waveguide layer 31, it is required that the refractive index of the waveguide layer 31 is larger than that of the substrate 1. Thus, the lens 5 is fabricated by a process shown in FIG. 2A.

Referring to FIGS. 2A(1) to 2A(5), a monocrystalline silicon substrate 1 having a main surface parallel to (111), (110) or (100) crystallographic plane is prepared and the main surface is polished to a mirror-like finish, as shown in FIG. 2A(1). A recess having a depth y and a radius R is formed in the main surface so that a concave mirror 32 is produced, as shown in FIG. 2A(2). $SiO_2$ films 33 and 34 having a refractive index of 1.46 and a thickness of about 2 μm are formed by thermal oxidation technique as shown in FIG. 2A(3), to use the film 33 as a buffer layer. Then, as shown in FIG. 2A(4), chalcogenide glass, for example, $As_2S_3$ glass having a refractive index of 2.5 is deposited on the buffer layer 33 to a thickness of about 1 μm by sputtering techniques, to form the waveguide layer 33, and then an $SiO_2$ film 28 is deposited on the waveguide layer 33 to a thickness of 2 μm by sputtering techniques, to be used as another buffer layer. Thereafter, that portion of the $SiO_2$ film 34 which exists under the concave mirror 32, is etched off and an etching operation is performed for the substrate, while using the $SiO_2$ film 34 as a mask. In the etching operation, a wet method using nitric acid or a dry method using chlorine fluoride is adopted to carry out isotropic etching, thereby forming a cylindrical through hole in the substrate 1. Thus, a waveguide lens 36 is obtained as shown in FIG. 2A(5). In order to increase the mechanical strength of the lens 36, a thin layer of the substrate 1 may be left unetched, under the lens 35. Then, piezo-electric actuators are formed on the upper surface of the waveguide lens 36 as shown in FIG. 2B. That is, a titanium layer is deposited on the buffer layer 28 and an Au or Pt layer is deposited on the titanium layer by evaporation techniques, to form electrodes 37 and 38 having a thickness of about 1 μm. Then, $PbTiO_3$ or ZnO is deposited on the Au or Pt layer to a thickness of 2 to 10 μm by sputtering techniques, to form piezoelectric films 29 and 30. The sputtering is carried out in an atmosphere of argon which contains a small amount of oxygen and is kept at a pressure of $10^{-1}$ Torr. Further, it is desirable to keep the substrate 1 at 500° C. during the sputtering operation. When the temperature of the substrate 1 is made low, the piezo-electric films 29 and 30 do not have a favorable crystal structure, and hence fail to exhibit ferroelectricity. In other words, it is necessary to choose optimum sputtering conditions in accordance with a piezoelectric material. Further, Au or Pt electrodes 39 and 40 are formed on the piezo-electric films 29 and 30. The electrodes 37, 38, 39 and 40 and the piezo-electric films 29 and 30 are formed as shown in FIG. 2B, through photolithographic techniques. That is, the electrodes 37 and 39 and the piezo-electric film 29 are formed on a central portion of the waveguide lens 36, and the electrodes 38 and 40 and the piezo-electric film 30 are formed on a peripheral portion of the waveguide lens 36. Further, the electrodes 37, 38, 39 and 40 are connected to electrode pads 41, 42, 43 and 44, respectively.

Figure 2C:
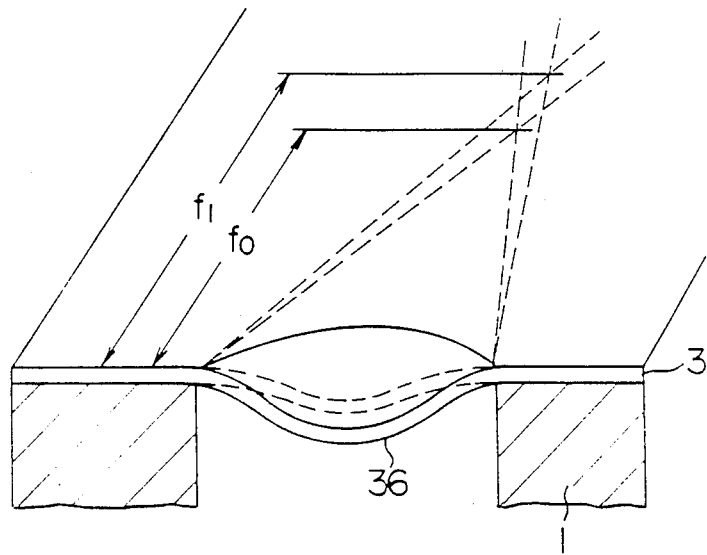
Figure 2D:
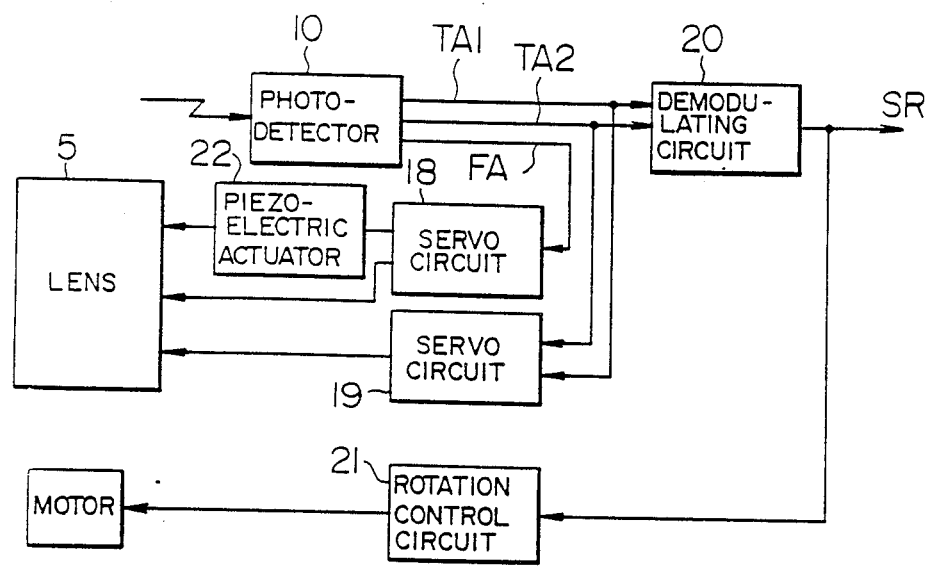

Now, the function of the above lens having the piezoelectric actuators will be explained. When the lower electrode 37 of the piezo-electric film 29 which is formed on the central portion of the waveguide lens 36, is applied with a negative potential, and the upper electrode 39 of the piezo-electric film 29 is applied with a positive potential, upward-directed polarization is generated in the piezo-electric film 29, and the film 29 contracts. Further, when the lower electrode 38 of the piezo-electric film 30 which is formed on the peripheral portion of the waveguide lens 36, is applied with a positive potential, and the upper electrode 40 of the piezoelectric film 30 is applied with a negative potential, the piezo-electric film 30 is enlarged. For example, when a voltage of 100 V is applied across each of the piezoelectric films 29 and 30, a strain in the order of $1 \times 10^{-4}$ is generated in the piezo-electric films 29 and 30. Accordingly, central and peripheral portions of the waveguide lens 36 are subjected to compression and tension, respectively, and thus the waveguide lens 36 is deformed so as to be convex downwardly. In other words, the waveguide lens 36 is bent from a position which is indicated by broken curves in FIG. 2C, to another position which is indicated by solid curves in FIG. 2C. The displacement y of the center of the lens 36 varies the focal length f of the lens 36 for parallel rays which are incident on the lens 36 from the front side thereof, in accordance with the following equation:

$$f = \frac{R}{2\left[1 - \cos\left(\tan^{-1}\frac{R}{y}\right)\right]} \quad (1)$$

where R indicates the radius of the waveguide lens, and y the depth (or displacement) of the center of the waveguide lens.

As can be seen from the above equation, when the center of the lens is displaced downwardly, that is, the displacement y is increased, the focal length f is decreased. In an example shown in FIG. 2C, the focal length $f_1$ is reduced to $f_0$. Now, let us consider a case where the waveguide lens 36 is used as the collimator lens 5 of FIG. 1A. In this case, the distance between the semiconductor laser 4 and the lens 5 is kept constant, and hence light rays emerging from the lens 5 are spread when the lens 5 is displaced downwardly. On the other hand, when the lens 5 is displaced upwardly, light rays emerging from the lens form a convergent light beam, which is incident on the objective lens 8. Thus, a position where a light beam emerging from the objective lens 8 is focused, can be controlled by the lens 5. In other words, even when the vertical movement of the optical disk 7 is caused by the rotation thereof, the light beam from the objective lens 5 can be focused on the recording medium 16 which is provided on the optical disk 7, without moving the substrate 1 of the present embodiment. The lens 5 having the actuators is small in size and weight, and has a natural frequency of tens of kilohertz. Hence the lens 5 can make the focus control at high speed. When the sensitivity of the recording medium 16 is increased, the optical disk 7 can be rotated at high speed to increase the information recording/reading speed. The present embodiment is suitable for such a high-speed operation.

Figure 3C:
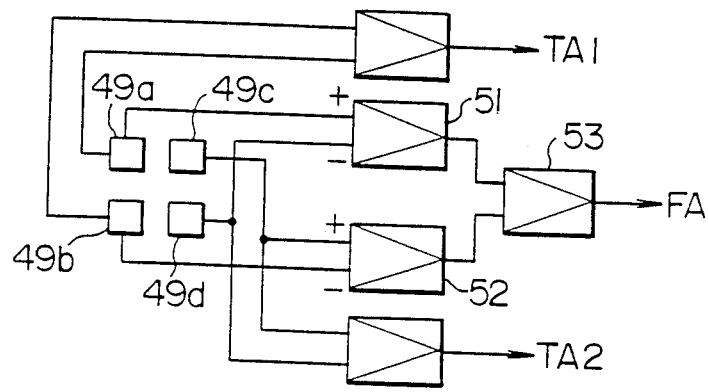
FIG. 3C is a circuit diagram which shows a circuit configuration for generating a focal error signal and a tracking error signal.
Figure 3A:
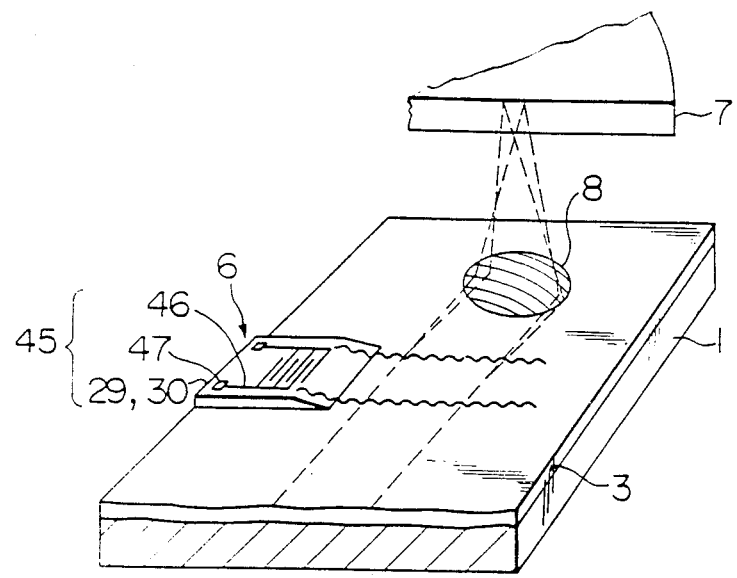
FIGS. 3A and 3B are schematic and cross-sectional diagrams showing a light beam deflector which is provided with a surface acoustic wave element.
Figure 3B:
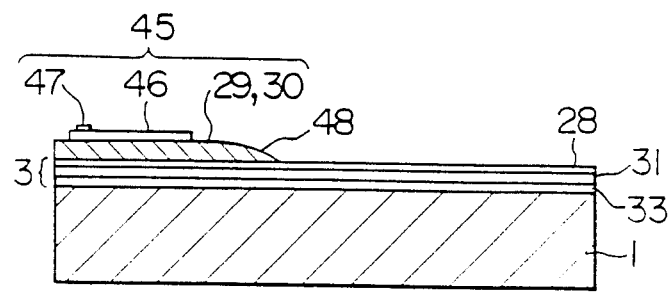

FIGS. 3A and 3B are perspective and sectional diagrams showing the beam deflector 6 which includes a surface acoustic wave element 45. The beam deflector 6 can perform a tracking operation together with the photodetector 10 shown in FIGS. 4A to 4E. Referring to FIGS. 3A and 3B the piezo-electric film 29 or 30 made of, for example, ZnO is formed on the optical waveguide 3 by sputtering techniques, and comb-shaped electrodes 46 and electrode pads 47 for supplying a voltage between the electrodes are formed on the piezo-electric film 29 or 30 by evaporation techniques. An end portion 48 of the piezo-electric film inclines slowly to the optical waveguide 3, to propagate a surface acoustic wave which is generated by the comb-shaped electrodes 46, efficiently into the optical waveguide 3. A deflection angle $\theta_B$ of light beam is given by the following equation:

$$\theta_B = \sin^{-1}\left(\frac{\lambda}{2n\Lambda}\right) \quad (2)$$

where $\lambda$ indicates the wavelength of light beam, n the refractive index of the optical waveguide, and $\Lambda$ the wavelength of the surface acoustic wave.

The wavelength $\Lambda$ of the surface acoustic wave is determined from the propagation velocity v thereof in the optical waveguide and an exciting frequency f (namely, the frequency of a voltage applied between the electrodes 46). In a case where the waveguide layer 31 is made of $As_2S_3$, and the propagation velocity v and the exciting frequency f are equal to 2.6 km/s and 100 kHz, respectively, the light beam is deflected by an angle of 0.07°. In a case where the light beam emerging from the objective lens 8 falls on a central region of a track, the reflected light from the optical disk 7 will have intensity distribution which shows the Gaussian distribution symmetrical with respect to an optical axis. The reflected light is further reflected from the beam splitter 9, and is then led to the photosensors through the coupling lens 11. Accordingly, the light incident upon the photosensors is symmetrical with respect to an optical axis. Thus, as can be seen from FIG. 4B, the outputs of four photosensors 49a to 49d are substantially equal to each other. Incidentally, in FIGS. 4B and 4C, reference symbols 50a and 50b designate reflectors formed on the waveguide layer 31. The above reflector is formed of a curved grating, which is made of a material having a high refractive index such as SiN. As shown in FIG. 4C, the reflectors 50a and 50b can increase the light quantity supplied to the photosensors 49a to 49d which are formed in the substrate 1 so as to be kept in contact with the buffer layer 33. Thus, large outputs can be obtained from the photosensors 49a to 49d.

Figure 4D:
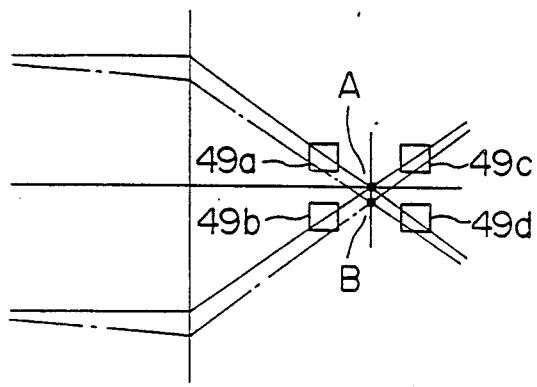
Figure 4E:
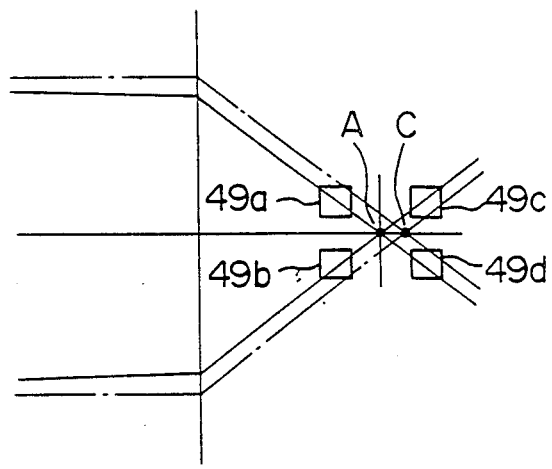

In a case where the center line of a track deviates from the center of incident light beam, that part of the light beam which impinges on an end portion of the track, is scattered by the optical disk 7, and thus does not reach the photosensors. In other words, the reflected light from the optical disk 7 has asymmetric intensity distribution with respect to an optical axis. Thus, as shown in FIG. 4D, the center of intensity distribution is moved from a point A to another point B. Accordingly, the output of the photosensor 49a differs from that of the photosensor 49b, and the output of the photosensor 49c differs from that of the photosensor 49d. Thus, as shown in FIG. 3C, the tracking signals TA1 and TA2 are produced. In a case where the optical disk 7 is moved downwardly and a focal error is generated, the light beam incident on the photosensors, as shown in FIG. 4E, is not focused on the point A, but is focused on a point C. Accordingly, the quantity of light incident on each of the photosensors 49a and 49b is increased, and the quantity of light incident on each of the photosensors 49c and 49d is decreased. Thus, as shown in FIG. 3C, the outputs of the photosensors 49a and 49d are applied to a differential amplifier 51, and the outputs of the photosensors 49b and 49c are applied to another differential amplifier 52. Further, the absolute values of the outputs of the amplifiers 51 and 52 are added to each other by an amplifier 53, to obtain a focal error signal FA. The autofocusing operation using the focal error signal has been explained, with reference to FIG. 2D.

Figure 5A:
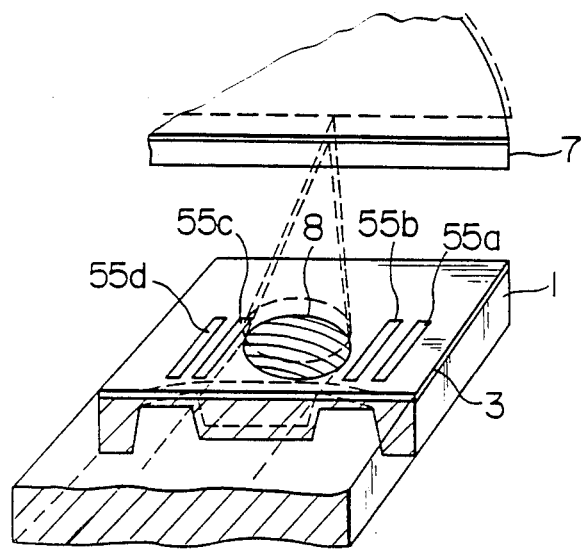
FIGS. 5A, 5B, 5C(1) to 5C(3), 5D(1) to 5D(5) and 5E are schematic and cross-sectional diagrams for explaining the structure, operation and fabrication process of an example of an objective lens with an actuator according to the present invention.
Figure 5B:
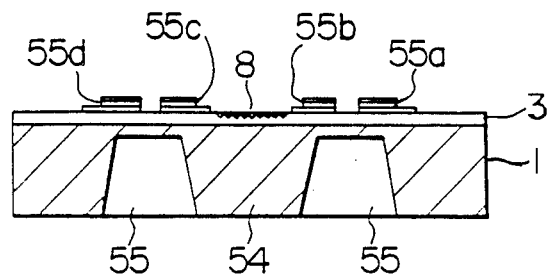

Now, explanation will be made of another example of a lens having an actuator, with reference to FIGS. 5A to 5D. FIG. 5A is a perspective view showing the operation of the example which is used as the objective lens 8, and FIG. 5B is a sectional view of the example. FIGS. 5C(1) to 5C(3) include sectional views for explaining the function of the example. FIGS. 5D(1) to 5D(5) show the manufacturing process of the example. Referring to FIGS. 5A and 5B, the optical waveguide 3 is formed on the monocrystalline silicon substrate 1, and an annular recess 55 is formed in the substrate 1 from the lower surface thereof so that an island 54 is surrounded by the recess 55. Further, actuators 55a to 55d each formed of a piezo-electric film are provided on that portion of the optical waveguide 3 which exists on the recess 55, to drive the optical lens 8 formed on the island 54. These members are fabricated by the process shown in FIGS. 5D(1) to 5D(5).

Referring to FIGS. 5D(1) to 5D(5), main surfaces of the substrate 1 parallel to the (100) crystallographic plane are lapped to a mirror-like finish, as shown in FIG. 5D(1). Then, as shown in FIG. 5D(2), an SiO$_2$ layer having a refractive index of 1.46 is deposited on the main surfaces to a thickness of about 2 μm through thermal oxidation techniques, and the SiO$_2$ layer deposited on the upper main surface serves as the buffer layer 33. Further, a chalcogenide glass layer, for example, an As$_2$S$_3$ layer having a refractive index of 2.5 is deposited on the buffer layer 33 to a thickness of about 1 μm through sputtering techniques, to be used as the waveguide layer 31. Furthermore, another SiO$_2$ layer is deposited on the As$_2$S$_3$ layer to a thickness of 2 μm through sputtering techniques, to be used as the upper buffer layer 28. Thereafter, as shown in FIG. 5D(3), a central portion of the upper buffer layer 31 is removed, and a curved grating having a saw-tooth cross section (namely, a curved grating having a blaze angle) is formed in the exposed portion of the waveguide layer 31 by fine working, to obtain the objective lens 8. (The above-mentioned curved grating will be explained later in more detail.) Then, as shown in FIG. 5D(4), an electrode film 56 made of Au or Pt is deposited on the buffer layer 28 to a thickness of about 1 μm through evaporation techniques, and a ZnO layer 57 is deposited on the electrode film 56 to a thickness of about 10 μm by sputtering techniques. Further, another electrode film 58 made of Au or Pt is deposited on the ZnO layer 56. The electrode films 56 and 58 and the ZnO layer 57 are subjected to patterning through photolithographic techniques so as to have desired forms. Finally, as shown in FIG. 5D(5), an annular recess 59 is formed in the substrate 1 from the lower surface thereof so that the objective lens 8 exists on an island surrounded by the recess 59. The annular recess 59 is formed in the following manner. When the central portion of the upper buffer layer 28 is removed, an annular portion of the SiO$_2$ film formed on the lower main surface of the substrate 1 is also removed. An etching operation is performed for the substrate 1 while using the remaining portion of the above SiO$_2$ film as a mask. In this etching operation, an alkali etchant is used which contains an aqueous solution of KOH and isopropyl alcohol. In this case, etching proceeds in a direction perpendicular to the (100) crystallographic plane, and thus a flat surface parallel to the (100) plane is exposed by etching. In other words, anisotropic etching is carried out.

The curved grating having a saw-tooth cross section is formed in the following manner.

A resist film for electron beam is deposited on the waveguide layer 31 to a thickness of about 1 μm by the spin coat method.

Figure 5E:
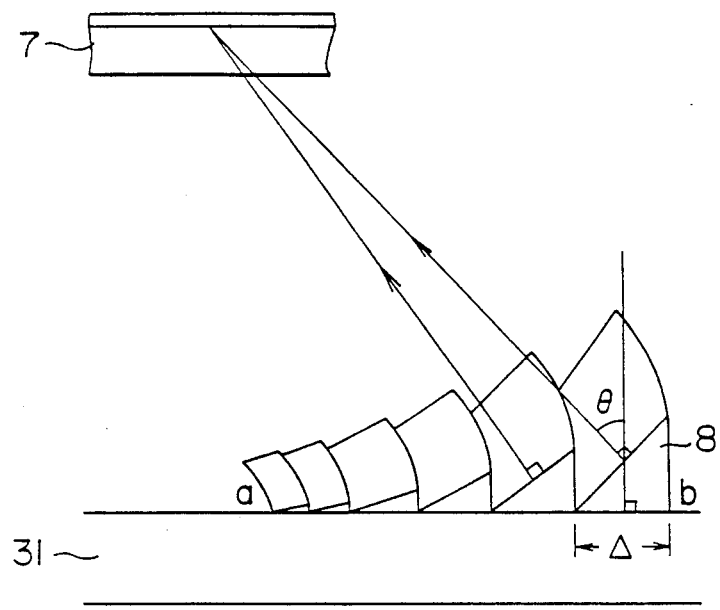

Then, the resist film is bombarded with an electron beam in accordance with the saw-tooth cross section of curved grating shown in FIG. 5E, to control the amount of bridge formation in the resist film. Then, the resist film is developed, to form the curved grating having the saw-tooth cross section, in the resist film.

Then, ion milling or dry etching is carried out while using the resist film as a mask, to form the same curved grating as in the resist film, in the chalcogenide glass layer 31.

As mentioned above, the objective lens according to the present invention is formed of a curved grating having a blaze angle, to send out light efficiently into the air. As is apparent from FIG. 5E, in order to focus the light beam emerging from the waveguide layer 31 on a point, an angle θ between the traveling direction of emerging light and a normal to the waveguide layer 31 is decreased as the width Δ of groove (namely, tooth) is smaller. Further, the surface of the grating is formed so that each emerging light ray is perpendicular to the surface of groove. That is, the objective lens has a cross section shown in FIG. 5E, and the objective lens, that is, the grating is so curved as to satisfy a phase matching condition. The curved grating having such a saw-tooth cross section can send out light efficiently into the air and moreover can focus the light on a point.

Now, the operation of the objective lens 8 will be explained, with reference to FIGS. 5A and 5C(1) to 5C(3). The vertical movement of the optical head 7 is caused by the rotation thereof, and thus the light beam emerging from the objective lens 8 is not always focused on the recording medium. Accordingly, it is required to move the objective lens in a vertical direction so that the light beam from the objective lens 8 is always focused on the recording medium. Referring to FIG. 5C(2), when the optical head 7 moves downwardly, voltages are applied to the piezo-electric actuators 55a to 55d so that the inner actuators 55b and 55c contract and the outer actuators 55a and 55d expand, that is, the island 54 having the objective lens 8 thereon is moved downwardly so that the light beam is focused on the recording medium. The autofocusing operation is performed in the same manner as explained with reference to FIG. 4E. When the optical disk 7 moves upwardly, the operations of the actuators 55a to 55d are reversed, to move the island 54 upwardly.

Next, the tracking operation of the objective lens 8 will be explained. Referring to FIG. 5C(3), in a case where a track is deviated from a predetermined position to the right, the actuators 55b and 55d contract and the actuators 55a and 55c expand so that a right portion of the objective lens 8 moves downwardly and a left portion thereof moves upwardly. The tracking error can be detected in the manner shown in FIG. 4D, and the objective lens 8 is inclined in accordance with the detected tracking error A main feature of the above objective lens resides in that the objective lens is formed on the island 54, and thus the lens 8 is not deformed even when the island 54 is displaced, that is, the aberration due to the deformation of the objective lens never occurs.

Figure 6:
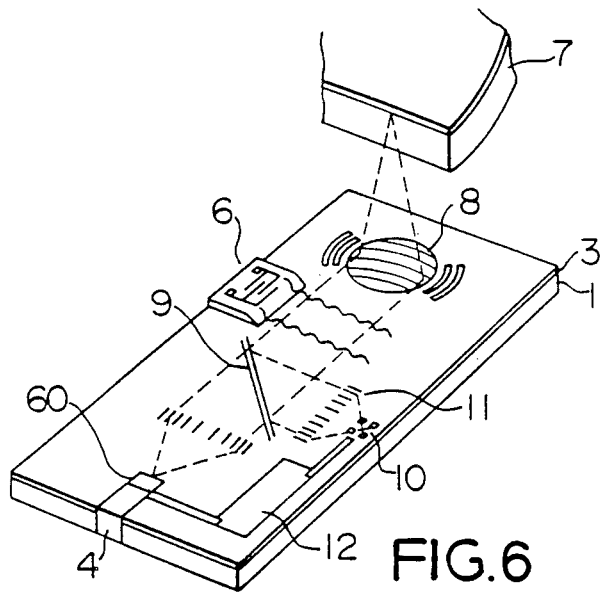
FIG. 6 is a schematic diagram showing another embodiment of an integrated optical head according to the present invention, which embodiment includes means for generating the second-order higher harmonic of a laser beam.

FIG. 6 shows another embodiment of an integrated optical head according to the present invention. The present embodiment is different from the embodiment of FIG. 1A only in that a second-order higher harmonic generator 60 is used. The semiconductor laser 4 is usually made of a GaAlAs alloy system, and the wavelength λ of the laser beam emitted from the semiconductor laser 4 is about 0.8 μm. In this case, the diameter d of a recorded dot is determined from the numerical aperture NA of the objective lens, that is, is given by the following equation:

$$d = \lambda/NA \tag{3}$$

When the numerical aperture NA is made equal to 0.5, the diameter d is equal to 1.6 μm. In other words, the recording density in the recording medium is determined by the above value. However, the recording density can be increased by using the second-order higher harmonic generator 60 for converting the laser beam into a light beam having a shorter wavelength. The higher harmonic generator 60 utilizes the nonlinear optical effect, and hence light emerging from the generator 60 is inferior in intensity to incident light. However, the improvement of recording density in a recording medium is earnestly desired, and the second-order higher harmonic generator is energetically developed. It has been confirmed that the second-order higher harmonic generator 60 can be made of $LiNbO_3$. In the present embodiment, the generator 60 is disposed in front of the light emitting surface of the semiconductor laser 4. However, in a case where the substrate 1 is made of $LiNbO_3$, the second-order higher harmonic generator 60 may be formed of a portion of the substrate. It is to be noted that the higher harmonic generator 60 is used to make short the wavelength of light incident on the recording medium, thereby increasing the recording density.

As has been explained in the foregoing, according to the present invention, various optical elements making up an optical head are integrated on a single substrate, and moreover a lens having actuators is formed on the substrate. Thus, light emerging from the optical head can be always focused on a recording medium without moving the substrate. Accordingly, the optical head can access information at a speed which is about ten times higher than a conventional speed.

Further, the working efficiency and sensitivity of each of optical elements making up the integrated optical head have been improved, and hence the accuracy in recording or reading out information is increased.

Furthermore, an integrated optical head according to the present invention dispenses with a conventional focus control device which moves the whole of the substrate. Accordingly, the size of the integrated optical head can be made equal to or less than one-tenth of that of a conventional optical head. Thus, the integrated optical head can access a multiple optical disks, and hence can process a large amount of information. In more detail, the amount of information processed by the integrated optical head is tens of times larger than the amount of information processed by a conventional optical head.

What is claimed is:

1. An optical head including a substrate, an optical waveguide formed on the substrate, a light source formed on a portion of the substrate, a collimator lens for converting light from the light source into parallel light rays, an objective lens for focusing light from the collimator lens on a recording medium and for converting reflected light from the recording medium into parallel light rays, a beam splitter for dividing light from the objective lens into two parts to send out one of the parts in a predetermined direction, a coupling lens for focusing light from the beam splitter on a position, and a photodetector for detecting light from the coupling lens, wherein at least one of the collimator lens and an objective lens supporting part formed on a thin portion of the substrate is made flexible to vary the position of the focus of at least one of the collimator lens and the objective lens by piezo-electric elements.

2. An optical head according to claim 1, wherein the objective lens is formed of a curved grating having a blaze angle.

3. An optical head according to claim 1, wherein a surface acoustic wave element is mounted on a portion of the substrate to form an optical deflector, thereby deflecting light which passes through the optical waveguide.

4. An optical head including a substrate, an optical waveguide formed on the substrate, a light source formed on a portion of the substrate, a collimator lens for converting light from the light source into parallel light rays, an objective lens for focusing light from the collimator lens on a recording medium and for converting reflected light from the recording medium into parallel light rays, a beam splitter for dividing light from the objective lens into two parts to send out one of the parts in a predetermined direction, a coupling lens for focusing light from the beam splitter on a position, and a photodetector for detecting light from the coupling lens, wherein the collimator lens, the objective lens, the beam splitter, the coupling lens and the photodetector are integrated on the substrate, and at least one of the collimator lens and an objective lens supporting part is made flexible to vary the position of the focus of at least one of the collimator lens and the objective lens by piezo-electric elements wherein the collimator lens comprises a flexible disk which can be convex downwardly or upwardly, and wherein one of said piezo-electric elements is mounted on a central portion of the collimator lens and another of said piezo-electric elements is mounted on a peripheral portion of the collimator lens, said one and said another of said piezo-electric elements being opposite in driving polarity to each other.

5. An optical head including a substrate, an optical waveguide formed on the substrate, a light source formed on a portion of the substrate, a collimator lens for converting light from the light source into parallel light rays, an objective lens for focusing light from the collimator lens on a recording medium and for converting reflected light from the recording medium into parallel light rays, a beam splitter for dividing light from the objective lens into two parts to send out one of the parts in a predetermined direction, a coupling lens for focusing light from the beam splitter on a position, and a photodetector for detecting light from the coupling lens, wherein the collimator lens, the objective lens, the beam splitter, the coupling lens and the photodetector are integrated on the substrate, and at least one of the collimator lens and an objective lens supporting part is made flexible to vary the position of the focus of at least one of the collimator lens and the objective lens by piezo-electric elements wherein a portion of the substrate is made thin to form a flexible supporting part around the objective lens, and two of said piezo-electric elements are an inner piezo-electric element and an outer piezo-electric element mounted on the flexible supporting part which are operated in opposite driving polarities.

6. An optical head including a substrate, an optical waveguide formed on the substrate, a light source formed on a portion of the substrate, a collimator lens for converting light from the light source into parallel light rays, an objective lens for focusing light from the collimator lens on a recording medium and for converting reflected light from the recording medium into parallel light rays, a beam splitter for dividing light from the objective lens into two parts to send out one of the parts in a predetermined direction, a coupling lens for focusing light from the beam splitter on a position, and a photodetector for detecting light from the coupling lens, wherein the collimator lens, the objective lens, the beam splitter, the coupling lens and the photodetector are integrated on the substrate, and at least one of the collimator lens and an objective lens supporting part is made flexible to vary the position of the focus of at least one of the collimator lens and the objective lens by piezo-electric elements further comprising a second-order higher harmonic generator converting light emitted from said light source into light having a shorter wavelength, to increase the recording density in the recording medium.

* * * * *